No. 726,869. PATENTED MAY 5, 1903.
F. B. COREY.
TROLLEY WHEEL.
APPLICATION FILED AUG. 21, 1902.
NO MODEL.
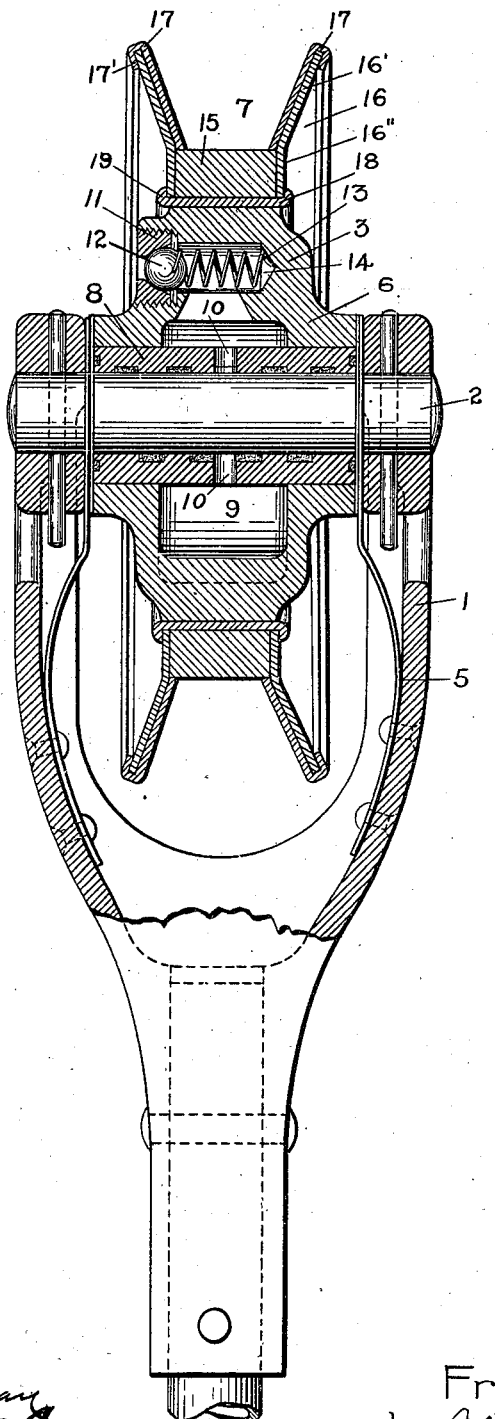
WITNESSES: INVENTOR:
Fred B. Corey,
by Atty.

No. 726,869. Patented May 5, 1903.

UNITED STATES PATENT OFFICE.

FRED B. COREY, OF SCHENECTADY, NEW YORK, ASSIGNOR TO GENERAL ELECTRIC COMPANY, A CORPORATION OF NEW YORK.

TROLLEY-WHEEL.

SPECIFICATION forming part of Letters Patent No. 726,869, dated May 5, 1903.

Application filed August 21, 1902. Serial No. 120,483. (No model.)

*To all whom it may concern:*

Be it known that I, FRED B. COREY, a citizen of the United States, residing at Schenectady, county of Schenectady, State of New York, have invented certain new and useful Improvements in Trolley-Wheels, of which the following is a specification.

The object of my invention is the production of a trolley-wheel which is of good mechanical construction and in which the parts subjected to wear can be readily replaced.

The invention consists in certain features of construction, which will be more fully pointed out in the claims.

In the accompanying drawing and description, forming a part of this specification, I have illustrated and described one embodiment of my invention.

In the drawing I have shown a harp 1 of the usual construction, supporting a journal 2, on which the trolley-wheel 3 turns. Bearing-springs 5 of the usual form are carried by the harp and engage against the end surface of the hub of the trolley-wheel to give the desired electrical contact between the harp and the wheel. The trolley-wheel itself is formed in two parts, one a body portion 6 and the other a rim portion 7. The body portion of the wheel is tubular and has a suitable bushing 8 inserted in it, which forms the bearing for the journal 2. The tubular opening in the wheel is of a size so that the bushing is firmly engaged at its ends only, the interior portion of the wheel being hollowed out to form an oil-receptacle 9, which surrounds the main part of the bushing 8. Suitable openings 10 are formed in the bushing, by means of which the lubricant can pass from the oil-receptacle to the inner surface of the bushing. A threaded opening is formed in the side of the body portion of the wheel, through which the oil can be poured into the receptacle. A tubular nut 11 is screwed into this opening. A ball-valve 12 is provided with a suitable supporting-spring 13 and is mounted within a transverse recess 14 adjacent to the threaded opening and normally closes the channel through the tubular nut 11. The rim portion of the wheel comprises a tread portion 15, flange portions 16, lining members 17, and a supporting member 18. The tread portion 15 is ring-shaped and is substantially rectangular in cross-section and may be made from a section of tube, if desired, and is preferably made of copper. The flange members 16 are alike in construction and are annular-shaped pieces of sheet metal, preferably sheet-steel, each having an outer flared portion 16' and an inner portion 16", which is in a plane at right angles to the axis of the wheel, parallel to the edges of the tread 15, and of radial depth equal to that of the tread-piece. The inner diameter of the flanges 16 is equal to the inner diameter of the tread-piece 15. The supporting member 18 is cylindrical in form and may be made from a section of steel tube, the outer diameter of which is such as to make a driving fit when inserted in the tread-piece 15. When the parts of the rim are assembled, the end portions of the supporting member 18 are bent or expanded to form flanges 19, which lie against the outer surface of the flange members 16 and permanently hold together the parts forming the rim of the wheel. The lining members 17 are annular in form and are made out of some soft metal, such as brass, and are shaped to lie against the inner surfaces of the portion 16' of the flange. The inner edge of the lining member 17 abuts against the outer periphery or face of the tread-piece 15. The outer portion of the lining members 17 are turned over the outer periphery of the flanged member 16, forming a bead 17'. The use of the lining members 17 is desirable, as the steel flanges when directly in contact with the conductor become roughened, owing to the frequent arcing between the conductor and the trolley-wheel. This roughening of the flange member causes it to wear the conductor very rapidly. The repeated arcing, in fact, gives the flange members a surface which is substantially that of a file. By the use of the lining members, however, the advantages of strength and rigidity due to the steel portion of the flange are obtained without the disadvantages above pointed out. The parts composing the rim portion, except the tread-piece, are all shaped by stamping, and all the parts comprising the rim portion are assembled in the same manner.

In the manufacture of these trolley-wheels the rim parts are first assembled and are then secured to the body portion of the wheel. I prefer to make the inner diameter of the supporting member 18 somewhat less than the outer diameter of the body portion 3 of the wheel and to secure the rim and hub together by forcing the one within the other in any suitable manner, as in a hydraulic press. By this construction the expensive portion of the wheel—the body portion, containing the bushing, lubricating device, &c., which is an expensive portion of the wheel—can be easily withdrawn from the rim portion, which contains all of the parts subject to much wear, and can be inserted with but little difficulty in a new rim. The rim portion is so proportioned that the flanges and the tread-surface will wear out about the same time and when so worn is discarded as a whole.

What I claim as new, and desire to secure by Letters Patent of the United States, is—

1. In a trolley-wheel, a removable rim portion comprising a copper tread member and flanges formed of sheet-steel permanently secured to said tread member.

2. In a trolley-wheel, a removable rim portion comprising a tread member and separate flange members permanently secured thereto.

3. In a trolley-wheel, a ring-shaped tread member, sheet-metal flange members, and an annular supporting member mounted within said tread member with its ends turned up to clamp said flange members to said tread member.

4. In a trolley-wheel, a removable rim portion comprising a tread member, flange members, and an annular supporting member for clamping said tread member and flange members together.

5. A trolley-wheel comprising a body portion and a removable rim portion, the rim portion consisting of a ring-shaped tread member, annular flange members and a tubular supporting member.

6. A trolley-wheel comprising a cylindrical body portion and an annular rim portion, the rim portion consisting of an annular supporting member, a ring-shaped tread member mounted on said supporting member, and annular flange members also mounted on said supporting member on each side of said tread member, the edges of said supporting member being expanded to clamp said flanges and said tread member permanently together, the said rim portion being removably mounted on said body portion.

7. In a trolley-wheel, a removable rim portion comprising a tread member formed from a section of tubing, sheet-metal flange members, and means for securing said flange members to said tread member.

8. In a trolley-wheel, a ring-shaped tread member, annular flange members abutting against the sides of said tread member, annular lining-pieces for said flanges with their inner edges abutting against the face of said tread member and with their outer edges turned over and embracing the peripheries of the flange members.

9. In a trolley-wheel, a removable rim portion comprising a tread member made out of good conducting material, and flanges formed of sheet metal permanently secured to said tread member.

In witness whereof I have hereunto set my hand this 18th day of August, 1902.

FRED B. COREY.

Witnesses:
BENJAMIN B. HULL,
ALMA L. MENSCHKE.